United States Patent Office 3,148,958
Patented Sept. 15, 1964

3,148,958
ALCOHOL FUEL GEL
John Alexander Monick, Teaneck, N.J., assignor to Colgate-Palmolive Company, New York, N.Y., a corporation of Delaware
No Drawing. Filed June 21, 1961, Ser. No. 124,763
15 Claims. (Cl. 44—7)

This invention relates to gel compositions. More particularly the invention relates to fuel gel compositions. Fuel gel compositions are known. However, may of the fuel gels available present serious drawbacks, especially in regard to safe, non-hazardous utilization. For example, many of the presently known fuel gels burn with a smoky flame and the formation of soot. Some of them give off highly poisonous fumes. Others burn with a non-luminous flame and it is very difficult to see that combustion is taking place, thereby increasing the possibility of injury from burns. Moreover, many of the known fuel gels leave a relatively large malodorous residue after burning. In addition some of the known fuel gels break down during burning and, therefore, exhibit poor combustion properties. There exists an obvious need to provide a fuel gel which overcomes these serious drawbacks.

The present invention provides an extrudable stable fuel gel composition comprising a major amount of at least one low molecular weight alcohol containing from 2 to 6 carbon atoms, a minor amount of a hydrophilic carboxy vinyl polymer sufficient to form a permanently stable substantially non-thixotropic gel with said alcohol, a neutralizing amount of a weak amine base and water. Such a composition has excellent properties of combustion, and overcomes the numerous disadvantages mentioned hereinabove.

The low molecular weight alcohols which can be employed in the practice of the present invention are those containing from 2 to 6 carbon atoms, such as ethanol, propanol, isopropanol, butanol, isobutanol, hexanol and the like. These alcohols can be employed alone or in mixture with each other. Although ethyl alcohol alone forms an excellent combustible gel, it burns with a substantially non-luminous flame. Accordingly, it is preferred that one of the other alcohols, that is the 3–6 carbon alcohols, be utilized therewith when luminosity is desired. In such a mixture, the alcohol used with ethyl alcohol is generally present in an amount of about 20% to 40% by weight, based on the total weight of the composition. Commercial ethyl alcohol containing such relatively innocuous substances as brucine and brucine sulfates, which are complex alkaloids, or denaturants are preferred in preparing gel fuels in accordance with the present invention. However, ethyl alcohol containing other known denaturants can also be used. On the other hand, the 3 to 6 carbon atom alcohols when used alone normally provide both excellent properties of combustibility, as well as luminosity. As pointed out hereinabove, the alcohols are employed in a major amount. However, the total amount of alcohol or mixtures thereof can vary widely so long as such amount accounts for the major ingredient in the composition. Preferably, however, the total alcoholic content in the new fuel gel of this invention is in a range of about 65% to 90% by weight, based on the total weight of the composition, and compositions containing from about 85% to 90% being especially preferred since they exhibit extremely good properties of odorless, smokeless combustion and only a small amount of residue. It is to be noted, however, that the optimum amount of alcohol or alcohol mixtures for any particular fuel gel can be determined by routine tests.

The carboxy vinyl polymer employed to form the new fuel gels of this invention are generally synthetic mucilaginous hydrophilic substances which preferably contain carboxylic salt groups. It is preferred to employ cross-linked polymers which are produced by the polymerization or intermolecular reaction of two or more different monomers containing polyfunctional groups. The term polymer includes, therefore, copolymers. Suitable examples of such polymers are disclosed in British patent specification No. 799,951, published August 13, 1958, and U.S. Patent 2,798,053, granted July 2, 1957. The polymers disclosed therein are compositions comprising a cross-linked interpolymer of (a) a monoolefinic monomeric material comprising at least 25% by weight of a monomeric olefinically-unsaturated carboxylic acid containing at least one activated carbon to carbon double bond such as acrylic acid, and (b) from about 0.01% to 10.0% by weight of a polyunsaturated cross-linking agent containing a plurality of polymerizable vinyl or crotyl groups such as a polyalkenyl polyether of a polyhydric alcohol. More particularly the preferred interpolymers are derived from a mixture of acrylic acid and a polyether of sucrose in which the hydroxyl groups which are modified are etherified with at least two allyl groups per molecule. A specific example of such a material is one containing about 97.5% to 99.8% by weight of acrylic acid and about 0.2% to about 2.5% by weight of a monomeric polyether of sucrose in which the hydroxyls are etherified with at least two, and preferably about five to about six allyl groups per sucrose molecule. Such carboxylic polymers are available commercially in the free acid form and neutralized by the presence of a weak amine base contained in the composition and defined hereinbelow. As stated heretofore, these carboxy vinyl polymers are employed in minor amounts in the new compositions of this invention. Moreover, they are employed by direct addition to the alcohol or alcohol mixtures or they can be employed in water solutions or dispersions, the preferred amounts used being about 1.5% to about 5.0% by weight based on the total weight of the composition, with compositions containing about 2.5% performing admirably well in forming a permanently stable gel fuel. On the other hand, the particular amount of polymer best suited for any specified fuel gel composition can be readily determined by routine tests.

Generally any weak amine base can be used in preparing the new composition of this invention in order to neutralize the carboxy vinyl polymers defined above. Although the weight percent amount of any particular amine compound employed should be enough to completely neutralize the acidic polymer and is preferably equal by weight to the weight of polymer present in the composition, greater or lesser amounts can usefully be present in the composition so long as the amount present is substantially completely utiltized for neutralization of the acidic polymer. Among the preferred amines which are useful in preparing the new fuel gel composition of the invention are the mono-, di- and tri-aliphatic amines containing from 1 to about 8 carbon atoms in the aliphatic carbon chain and wherein the substituent group can be the same or different in the di- and tri- compounds. However, the amines containing one or more aliphatic groups containing 3 to 8 carbon atoms are especially preferred. Among such compounds are mono-, di- and tri- methyl, ethyl, propyl, butyl, amyl, hexyl amines and the like. A particularly effective amine is di-2-ethylhexyl amine. It is to be noted that the terminology "weak amine base" is also intended to include alkylolamines containing from 1–8 carbon atoms in the alkyl group. Such compounds include the mono-, di- and tri- methanolamines, ethanolamines, propanolamines, etc. and the like.

The new fuel gel compositions of the invention also have water present therein in widely varying amounts. The amount of water used is primarily dependent upon the desired properties of combustion in the final composition, the amount necessary to form a gel with the acidic polymer and the particular alcohols or mixtures of alcohols employed. Normally, the amount of water in any particular composition must be increased to form a stable gel as the number of carbon atoms in the alcohol are increased. Generally, however, the water is used in a range of about 5% to about 25% by weight, based on the total weight of the composition and from about 5 to 10% being preferred to prepare compositions exhibiting good wind-resistant properties. The most effective amount of water for any particular composition can be readily determined by routine tests.

As an optional constituent, the new fuel gel compositions of this invention can also contain a dye in small amounts for the purpose of identification or esthetic value. Generally, the dye is utilized in amounts as small as 0.001% and utilized as a 0.1% alcohol solution. One particular effective dye is Rose Bengal Dye manufactured by Allied Chemical Corporation, National Aniline Division.

The new fuel gel compositions of this invention generally have a viscosity of about 40,000 cps. at 25° C. determined by use of a Brookfield viscometer at 10 r.p.m. using a No. 7 spindle. However, the viscosity increases to about 140,000 cps. using a No. 7 spindle at 2 r.p.m., thereby indicating that the compositions are substantially non-thixotropic in nature and form a permanently stable extrudable gel. Moreover, the new compositions burn with a smokeless odorless flame which is either luminous or non-luminous depending upon the alcohols employed. Furthermore, the fuel gels of this composition are substantially non-thixotropic and stable over long storage periods and do not break down during combustion. In addition, substantially no residue remains after combustion and the compositions can be extruded from tubes without losing their shape.

The new fuel gel compositions of this invention can be prepared by relatively simple formulation procedures. The alcohol or alcohol mixture and dye solution, where one is used, are added to a mixing vessel with water in the required amounts. Next to the required amount of carboxy vinyl polymer is added to the mixture while stirring vigorously until a homogeneous mixture is obtained. Subsequently the neutralizing agent is added to the mixture while it is vigorously stirred. Agitation of the mixture is continued at increased speeds as the gel develops and continued for a period of time sufficient to insure a substantially complete neutralization and homogeneous gel composiiton. During agitation care should be taken to avoid vortex formation in order to prevent aeration. The process is generally carried out at room temperature (ca. 20° C.) and atmospheric pressure.

In order to illustrate the instant invention more fully the following illustrative examples are set forth. In the examples all parts and percents are by weight unless otherwise stated.

*Example I*

An extrudable stable fuel gel composition was prepared by initially adding 61.99 grams of SD#3A ethyl alcohol, 25.0 grams of 98% isopropyl alcohol, 8.0 grams of water and 0.1 gram of Rose Bengal Dye solution (1% in 3A ethanol) to a mixing vessel. Subsequently 2.5 grams of an unneutralized carboxyvinyl copolymer of about 99% by weight of glacial acrylic acid and about 1% by weight of polyallyl sucrose in which the sucrose molecule has an average of about 5 to 6 allyl groups were slowly added to the mixture while stirring vigorously until the copolymer was well dispersed and dissolved. Subsequently, 2.5 grams of di-2-ethylhexyl amine were added to the mixture while the mixture was vigorously stirred. As the gel developed, the stirring was increased an additional 15 minutes to insure a completely neutralized homogeneous composition. The mixing was carried out at room temperature (ca. 20° C.) and at atmospheric pressure. The resulting fuel gel was a substantialy non-thixotropic extrudable stable composition. When extruded from a collapsible tube and ignited, the gel burned without losing its shape. Combustion was odorless, non-smoky and free of soot. The flame was steady, of excellent height and pale yellow in color. Only a negligible amount of residue remained when combustion was completed. Moreover, the flame exhibited good wind resistance.

*Example II*

The formulation of Example I is repeated except that the amount of ethyl alcohol is increased to 86.9 grams and the isopropyl alcohol is omitted. Like results were obtained except that the flame is substantially non-luminous.

*Example III*

The formulation of Example I is repeated except that 86.9 grams of 98% isopropyl alcohol is utilized. Results similar to those in Example I are obtained.

Numerous variations and modifications of the embodiments of this invention may be made without departing from the spirit and scope thereof. Accordingly, the invention is not to be restricted to the specific embodiments set forth herein except as defined in the appended claims.

What is claimed is:

1. An extrudable stable substantially non-thixotropic combustible fuel gel composition comprising by weight, based on the total weight of the composition, about 65% to 90% of at least one low molecular weight alcohol containing from 2 to 6 carbon atoms, about 1.5% to 5.0% of a hydrophilic cross-linked carboxy vinyl polymer, a sufficient amount of a weak amine base to completely neutralize said polymer and about 5% to 25% water.

2. A fuel gel composition in accordance with claim 1 wherein the alcohol is ethyl alcohol.

3. A fuel gel composition in accordance with claim 1 wherein the alcohol is isopropyl alcohol.

4. A fuel gel composition in accordance with claim 1 wherein the polymer is a cross-linked interpolymer of a monoolefinic monomer comprising at least 25% by weight of a monomeric olefinically-unsaturated carboxylic acid containing at least one activated carbon to carbon double bond and from about 0.01% to 10.0% by weight of a polyunsaturated cross-linking agent containing a plurality of polymerizable polyalkenyl groups.

5. An extrudable stable substantially non-thixotropic combustible fuel gel composition comprising by weight, based on the total weight of the composition, about 85% to 90% of at least one low molecular weight alcohol containing from 2 to 6 carbon atoms, about 2.5% to 5.0% of a hydrophilic cross-linked interpolymer of a mono-olefinic monomer comprising at least 25% by weight of a monomeric olefinically-unsaturated carboxylic acid containing at least one activated carbon to carbon double bond and from about 0.01% to 10.0% by weight of a polyunsaturated cross-linking agent containing a plurality of polymerizable polyalkenyl groups, 2.5% to 5.0% of a weak amine base and from 5% to 10% of water.

6. A fuel gel composition in accordance with claim 5 wherein the polymer is a copolymer of acrylic acid and polyallyl alcohol.

7. An extrudable stable substantially non-thixotropic combustible fuel gel composition comprising by weight, based on the total weight of the composition, about 85% to 90% of an alcoholic mixture comprising 60% to 80% by weight of ethyl alcohol and 20% to 40% by weight of an alcohol containing 3 to 6 carbon atoms, based on the total weight of the alcoholic mixture, about 2.5% to 5.0% of a hydrophilic cross-linked interpolymer of a mono-olefinic monomer comprising at least 25% by weight of a monomeric olefinically unsaturated carboxylic acid containing at least one activated carbon to carbon double bond and from about 0.01 to 10.0% by weight of a polyunsaturated cross-linking agent containing a plurality of polymerizable polyalkenyl groups, 2.5% to 5.0% of a weak amine base selected from the group consisting of mono-, di- and tri-amines and alkylolamines containing from 1 to 8 carbon atoms, and from 5% to 10% water.

8. A fuel gel composition in accordance with claim 7 wherein the 3 to 6 carbon alcohol is isopropyl alcohol.

9. A fuel gel composition in accordance with claim 7 wherein the 3 to 6 carbon alcohol is butyl alcohol.

10. A fuel gel composition in accordance with claim 7 wherein the 3 to 6 carbon alcohol is amyl alcohol.

11. A fuel gel composition in accordance with claim 7 wherein the 3 to 6 carbon alcohol is hexyl alcohol.

12. A fuel gel composition in accordance with claim 7 wherein the polymer is a copolymer of acrylic acid and polyallyl alcohol.

13. A fuel gel composition in accordance with claim 7 wherein the weak amine base is di-2-ethylhexyl amine.

14. A fuel gel composition in accordance with claim 7 wherein the weak amine base is triethanolamine.

15. An extrudable stable substantially non-thixotropic combustible fuel gel composition consisting of by weight, based on the total weight of the composition 62% of ethyl alcohol, 25% isopropyl alcohol, 2.5% of a hydrophilic cross-linked carboxy vinyl polymer consisting of 99% by weight of acrylic acid and 1% by weight of polyallyl sucrose in which the sucrose molecule has an average of about 5 to 6 allyl groups, 2.5% of di-2-ethylhexyl amine and 8% of water.

References Cited in the file of this patent

UNITED STATES PATENTS

| | | |
|---|---|---|
| 2,613,142 | Wiczer | Oct. 7, 1952 |
| 2,798,053 | Brown | July 2, 1957 |
| 2,838,384 | Sloan et al. | June 10, 1958 |
| 2,923,692 | Ackerman | Feb. 2, 1960 |